United States Patent Office 2,763,667
Patented Sept. 18, 1956

2,763,667

PROCESS FOR THE MANUFACTURE OF ANTHRAQUINONE VAT DYESTUFFS

Eduard Moergeli, Neuewelt, near Basel, Switzerland, assignor to Ciba Limited, Basel, Switzerland, a Swiss firm No Drawing. Application August 4, 1952, Serial No. 302,630

Claims priority, application Switzerland August 10, 1951

14 Claims. (Cl. 260—377)

According to this invention valuable anthraquinone vat dyestuffs are made by condensing in a first stage two molecular proportions of 1:5-diaminoanthraquinone with at least one and less than two molecular proportions, of an aromatic dicarboxylic acid dichloride, and acylating the product so obtained with a functional derivative of a monocarboxylic acid.

It is of advantage in the first stage of the process, that is to say, in the condensation of 1:5-diaminoanthraquinone with the aromatic dicarboxylic acid dichloride, to use an exclusively aromatic dicarboxylic acid dichloride, that is to say, one which contains only aromatic rings and in which the two carboxylic acid chloride groups are bound to aryl carbon atoms. Thus dicarboxylic acid dichlorides have proved to be especially advantageous which, when they contain more than one 6-membered aromatic ring contain exclusively fused-on rings, as, for example, in the case of fluoranthene-4:11-dicarboxylic acid dichloride and naphthalene-2:6-dicarboxylic acid dichloride. Among the benzene dicarboxylic acid dichlorides there may be mentioned more especially, those in which the two carbon atoms to which the carboxylic acid chloride groups are bound, are separated from one another by at least one carbon atom, as for example in the case of terephthalic acid dichloride. Especially valuable results are obtained with isophthalic acid dichloride.

The condensation is advantageously carried out in an inert solvent such as nitrobenzene, naphthalene, chlorobenzene, dichlorobenzene and especially trichlorobenzene. In many cases the presence of an acid-binding agent such as sodium carbonate or potassium carbonate, or an alkaline earth carbonate or oxide is of advantage. In many cases there may be added, instead of the above mentioned acid binding agents, organic bases especially tertiary bases such as pyridine, quinoline or dialkylanilines, or the action of the first-mentioned acid binding agents may be improved or supplemented by the addition of these bases.

In the condensation of 1:5-diaminoanthraquinone with the aromatic dicarboxylic acid it is in general of advantage to use the two reactants in a molecular ratio within the range of 2:1 to 2:1.5. In some cases especially valuable results are obtained with a molecular ratio of 2:1. It is also generally desirable to dissolve the diaminoanthraquinone in an inert solvent and to add the dicarboxylic acid dichloride relatively slowly to the solution, for example, in the course of a few hours. The temperature of the condensation may vary within relatively wide limits depending on the reactivity of the acid chloride and on the boiling point of the solvent used, and, for example, the temperature may be within the range of about 90–190° C. or be raised to the boiling points of the usual solvents.

The condensation product of 1:5-diaminoanthraquinone and the dicarboxylic acid dichloride obtained in the first stage may, if desired, be isolated from the reaction mixture. However, in many cases such isolation is not necessary and the resulting product can be used directly for the further acylating reaction. The acylation with a reactive derivative of a monocarboxylic acid may be carried out in a manner in itself known, for example, by the use of an acid halide, especially the acid chloride. As monocarboxylic acids for the acylation there may be used, more especially, aromatic monocarboxylic acids, for example, benzoic acids or their nuclear substitution products, for example, halogenbenzoic acids such as parachloro-, ortho-chloro-, or ortho-fluoro-benzoic acid or methoxy benzoic acid.

The dyestuffs are generally obtained by the present process in very good yield and in an unexpectedly pure state. If desired, they may be further purified by treatment with oxidizing agents, especially hypochlorites, and are in general not very considerably different in their properties from the corresponding known dyestuffs, which are obtained from the less easily accessible 1-amino-5-acylamino-anthraquinones and dicarboxylic acids.

This could not be foreseen as in the reaction of 1:5-diaminoanthraquinones with dicarboxylic acid dichlorides it could not be expected that the condensation would take place exclusively in the ratio of 2:1, especially in those cases in which more than one molecular proportion of dicarboxylic acid dichloride is used with two molecular proportions of 1:5-diaminoanthraquinone. However, in view of the properties of the dyestuffs obtained according to the present process (compare the foregoing paragraph) it is to be assumed that the condensation surprisingly does take place to a great extent in the ratio 2:1. Concerning the remaining portion of the reactants there is ground for supposing that depending on the ratio used and the constitution of the dicarboxylic acid dichloride, the condensation of 1:5-diamino-anthraquinone with the dicarboxylic acid dichloride actually occurs to some extent in a molecular ratio smaller than 2:1 but probably at the most in the ratio 3:2, and that on the other hand no products of considerably higher molecular weight are obtained. By the 3:2-condensation products present in the so-obtained dyestuffs the valuable properties of the latter are practically not altered.

The following examples illustrate the invention, the parts and percentages being by weight:

*Example 1*

A solution of 4.1 parts of isophthalic acid dichloride in 30 parts of trichlorobenzene is introduced dropwise in the course of 5 hours at 150 to 160° C., while stirring into a mixture of 9.5 parts of 1:5-diaminoanthraquinone, 100 parts of trichlorobenzene and 10 parts of pyridine. The whole is stirred for a further 2 to 3 hours, then the reaction mixture is diluted with 100 parts of trichlorobenzene, 10 parts of sodium carbonate are gradually added, and the pyridine is distilled off together with about 30 parts of trichlorobenzene. After cooling to 190–200° C., the mixture is cautiously mixed with 15 parts of benzoyl chloride, and then stirred until the acylation is finished, which is generally the case after about 30 minutes.

The dyestuff is filtered off at room temperature, and washed with alcohol and water and dried. It is a yellow powder which dissolves in concentrated sulphuric acid with an orange-red coloration, and dyes cotton from a Bordeaux colored hydrosulfite vat yellow tints having very good properties of wet fastness and a good fastness to light. The dyestuff is also excellently suited for printing textiles.

By using, instead of isophthalic acid dichloride, the same quantity of terephthalic acid dichloride a similar dyestuff is obtained.

Example 2

A solution of 4.1 parts of isophthalic acid dichloride and 35 parts of trichlorobenzene is introduced dropwise at a constant rate in the course of 5 hours at 180–190° C., while stirring into a mixture of 9.5 parts of 1:5-diaminoanthraquinone, 15 parts of sodium carbonate and 75 parts of trichlorobenzene. The whole is then heated to the boil, and a solution of 12 parts of ortho-fluorobenzoyl chloride in 35 parts of thichlorobenzene is cautiously introduced dropwise and the whole is stirred for a further hour.

After cooling, the reaction mixture is filtered, and the filter residue is washed with alcohol and then with ether, and the dyestuff is dried. It is a yellow powder which dyes cotton yellow tints of a more greenish shade than the dyestuffs described in Example 1.

Example 3

A solution of 5.1 parts of isophthalic acid dichloride in 30 parts of trichlorobenzene is introduced dropwise at a uniform rate in the course of 4 hours at 190–200° C. into a mixture of 9.5 parts of 1:5-diaminoanthraquinone, 110 parts of trichlorobenzene and 20 parts of sodium carbonate. The whole is stirred for a further hour, and a solution of 18 parts of benzoyl chloride in 75 parts of trichlorobenzene is added as rapidly as possible, and the whole is then stirred for a further 45 minutes at the boiling temperature. After cooling, the reaction mixture is filtered, the filter residue is washed with alcohol and water, and the dyestuff is dried. It dyes cotton from a Bordeaux colored vat fast yellow tints.

Example 4

A solution of 4.1 parts of isophthalic acid dichloride in 30 parts of trichlorobenzene is introduced dropwise at a uniform rate, while stirring, in the course of 4 hours at 180–190° C. into a mixture of 9.5 parts of 1:5-diaminoanthaquinone, 110 parts of trichlorobenzene and 20 parts of sodium carbonate. After a further hour the reaction mixture is diluted with 75 parts of trichlorobenzene, and filtered after cooling. The filter residue is washed with alcohol and water and dried. It is a red colored dyestuff intermediate, which is then heated in a finely dispersed condition with 13 parts of para-chlorobenzoyl chloride and 210 parts of trichlorobenzene for 2 hours at the boil. A dyestuff is obtained which dyes cotton from a Bordeaux colored vat fast yellow tints.

Example 5

A suspension of 3.27 parts of fluoranthene-4:11-dicarboxylic acid dichloride in 90 parts of trichlorobenzene is introduced dropwise, while stirring, in the course of 5 hours at 140–150° C. into a mixture of 4.76 parts of 1:5-diaminoanthaquinone, 75 parts of trichlorobenzene and 10 parts of sodium carbonate, and the whole is stirred for a further 2 hours. 9 parts of benzoyl chloride are added, and the mixture is maintained at the boil for 30 minutes and then allowed to cool. The dyestuff is filtered off, and washed with alcohol and water and dried. It dyes cotton from a Bordeaux colored vat fast reddish yellow tints.

By using, instead of fluoranthene-4:11-dicarboxylic acid dichloride, the corresponding quantity of naphthalene-2:6-dicarboxylic acid dichloride, a dyestuff is obtained which dyes cotton somewhat more reddish tints.

What is claimed is:

1. Process for the manufacture of anthraquinone vat dyestuffs, which comprises condensing in a first stage 2 molecular proportions of 1:5-diamino-anthraquinone with at least 1 and less than 2 molecular proportions of an aromatic dicarboxylic acid dichloride, and then acylating the so obtained product with a functional derivative of a monocarboxylic acid.

2. Process for the manufacture of anthraquinone vat dyestuffs, which comprises condensing in a first stage 2 molecular proportions of 1:5-diamino-anthraquinone with at least 1 and at the most 1.5 molecular proportions of an aromatic dicarboxylic acid dichloride, and then acylating the so obtained product with an aromatic monocarboxylic acid halide.

3. Process for the manufacture of anthraquinone vat dyestuffs, which comprises condensing in a first stage 2 molecular proportions of 1:5-diamino-anthraquinone with at least 1 and at the most 1.5 molecular proportions of an aromatic dicarboxylic acid dichloride in which, when it contains more than one six-membered aromatic ring, such rings are all fused-on rings, ant then acylating the so obtained product with an aromatic monocarboxylic acid halide of the benzene series.

4. Process for the manufacture of anthraquinone vat dyestuffs, which comprises condensing in a first stage 2 molecular proportions of 1:5-diaminoanthraquinone with at least 1 and at the most 1.5 molecular proportions of a benzene dicarboxylic acid dichloride in which the carbon atoms to which the two carboxylic acid chloride groups are bound are separated from one another by at least one carbon atom, and then acylating the so obtained product with an aromatic monocarboxylic acid halide of the benzene series.

5. Process for the manufacture of anthraquinone vat dyestuffs, which comprises condensing in a first stage 2 molecular proportions of 1:5-diamino-anthroquinone with at least 1 and at the most 1.5 molecular proportions of isophthalic acid dichloride and then acylating the so obtained product with benzoyl chloride.

6. Process for the manufacture of anthraquinone vat dyestuffs, which comprises condensing in a first stage 2 molecular proportions of 1:5-diamino-anthraquinone with one molecular proportion of isophthalic acid dichloride and then acylating the so obtained product with benzoyl chloride.

7. Process for the manufacture of anthraquinone vat dyestuffs, which comprises condensing in a first stage 2 molecular proportions of 1:5-diamino-anthraquinone with at least 1 and at the most 1.5 molecular proportions of terephthalic acid dichloride and then acylating the so obtained product with benzoyl chloride.

8. Process for the manufacture of anthraquinone vat dyestuffs, which comprises condensing in a first stage 2 molecular proportions of 1:5-diamino-anthraquinone with one molecular proportion of terephthalic acid dichloride and then acylating the so obtained product with benzoyl chloride.

9. Process for the manufacture of anthraquinone vat dyestuffs, which comprises condensing in a first stage 2 molecular proportions of 1:5-diamino-anthraquinone with at least 1 and at the most 1.5 molecular proportions of isophthalic acid dichloride and then acylating the so obtained product with para-chlorobenzoyl chloride.

10. Process for the manufacture of anthraquinone vat dyestuffs, which comprises condensing in a first stage 2 molecular proportions of 1:5-diamino-anthraquinone with one molecular proportion of isophthalic acid dichloride and then acylating the so obtained product with para-chlorobenzoyl chloride.

11. Process for the manufacture of anthraquinone vat dyestuffs, which comprises condensing in a first stage 2 molecular proportions of 1:5-diamino-anthraquinone with at least 1 and at the most 1.5 molecular proportions of fluoranthene-4:11-dicarboxylic acid dichloride and then acylating the so obtained product with benzoyl chloride.

12. Process for the manufacture of anthraquinone vat dyestuffs, which comprises condensing in a first stage 2 molecular proportions of 1:5-diamino-anthraquinone with one molecular proportion of fluoranthene-4:11-dicarboxylic acid dichloride and then acylating the so obtained product with benzoyl chloride.

13. Process for the manufacture of anthraquinone vat dyestuffs, which comprises condensing in a first stage 2 molecular proportions of 1:5-diamino-anthraquinone with at least 1 and at the most 1.5 molecular proportions of isophthalic acid dichloride and then acylating the so obtained product with ortho-fluorobenzoyl chloride.

14. Process for the manufacture of anthraquinone vat dyestuffs, which comprises condensing in a first stage 2 molecular proportions of 1:5-diamino-anthraquinone with one molecular proportion of isophthalic acid dichloride and then acylating the so obtained product with ortho-fluorobenzoyl chloride.

References Cited in the file of this patent

UNITED STATES PATENTS

| 1,897,430 | Honold | Feb. 14, 1933 |

FOREIGN PATENTS

| 388,889 | Great Britain | Mar. 9, 1933 |
| 658,722 | Great Britain | Oct. 10, 1951 |